United States Patent [19]

Agarwal et al.

[11] 4,001,011

[45] Jan. 4, 1977

[54] PYROMETALLURGICAL RECOVERY OF IRON FROM IRON SILICATE SLAGS

[75] Inventors: Jagdish C. Agarwal, Concord; Paul R. Ammann, Boxford; Jonathan J. Kim, Chelmsford, all of Mass.

[73] Assignee: Kennecott Copper Corporation, New York, N.Y.

[22] Filed: Dec. 29, 1975

[21] Appl. No.: 644,727

[52] U.S. Cl. .................................... 75/40; 75/24; 75/89
[51] Int. Cl.² ........................................ C21B 11/00
[58] Field of Search .............. 75/24, 29, 89, 40, 63

[56] References Cited

UNITED STATES PATENTS

| | | | |
|---|---|---|---|
| 2,546,936 | 3/1951 | Vignos .................................. | 75/24 |
| 3,002,832 | 10/1961 | Moussoulos ........................... | 75/24 |
| 3,232,742 | 2/1966 | Zimmerley et al. ................ | 75/40 X |
| 3,264,096 | 8/1966 | Agarwal et al. ....................... | 75/40 |
| 3,723,096 | 3/1973 | Parlee et al. .......................... | 75/40 |
| 3,857,700 | 12/1974 | Ammann et al. ...................... | 75/63 |
| 3,861,660 | 1/1975 | Ammann et al. ...................... | 75/24 |

*Primary Examiner*—M. J. Andrews
*Attorney, Agent, or Firm*—John L. Sniado; Lowell H. McCarter; Anthony M. Lorusso

[57] ABSTRACT

A process for recovering iron from preliminarily decopperized molten copper smelter slags having an initial composition which includes iron oxide, silica, and aluminum oxide as the major constituents. These constituents are initially present in the range of 40–70 percent FeO, 25–40 percent $SiO_2$ and 5–10 percent $Al_2O_3$. The slag is maintained in a molten state and a solid reductant is mixed into the slag using an internally cooled, metal bladed, rotating stirrer, which rotates at a rate sufficient to pump the reductant into the slag to enhance the reduction of the iron oxide. An important aspect of this invention is to reduce slag to recover iron when the slag contains the following constituents, 40–60 percent $SiO_2$, 15–35 percent CaO, less than 20 percent FeO and 5–10 percent $Al_2O_3$. Although the above constituents can vary within the range set forth, it is important to maintain the $SiO_2$ to CaO ratio in the range of about 2.0 – 3.3. Thus, along with the reducing agent, other constituents are added to the molten slag to maintain the slag with the desired composition set forth above. After reduction of the slag in accordance with the foregoing procedure, the iron bearing phase is separated from the slag in the form of a metal-rich matte containing 85–90 percent iron.

4 Claims, 2 Drawing Figures

1

PYROMETALLURGICAL RECOVERY OF IRON FROM IRON SILICATE SLAGS

BACKGROUND OF THE INVENTION

This invention relates to the recovery of iron values which would otherwise be lost as constituents of a waste slag.

While it has long been known that substantial quantities of iron have been lost through the discarding of slags (e.g., copper smelter slags), the lack of an economical recovery process, as compared to other sources of iron, has prevented the commercial acceptance of iron recovery from such slags. Furthermore, despite a substantial rise in the price of iron in recent years and despite the transportation costs involved in transporting iron to the location of a copper smelter to fulfill the need for iron in various processes (see, for example, U.S. Pat. No. 3,232,742, issued Feb. 1, 1966, and owned by the Assignee of the present invention), recovery of iron from copper smelting slags has evidently been ignored because of the lack of a suitable process.

As explained in U.S. Pat. Nos. 3,857,699 and 3,857,700 (both issued Dec. 31, 1974, owned by the Assignee of the present invention, and incorporated herein by reference), highly oxidized copper smelter slags can be treated to recover copper and molybdenum values therefrom. According to the present invention, however, it has been discovered that the slag remaining after the recovery of these metal values, which formed a waste product in those patents, can itself be treated to make feasible the recovery of iron from that slag.

Of course, it has long been known that ferrous silicates in slags can be reduced using carbon in order to recover iron from the slag. Examples of the many references acknowledging this theoretical possibility are Bryk et al., U.S. Pat. No. 2,523,092; Edlund, "Smelting Copper Reverberatory Slags to Recover Iron of Low Copper and Sulfur Content", Bureau of Mines Report of Investigations 6481 (1964); and Zimmerley et al, U.S. Pat. No. 3,232,742. In none of these references, however, is there any suggestion of the slag composition, and reaction rate enhancement technique, which have been identified according to the present invention as crucial to a commercially feasible recovery of iron from slags.

In view of the foregoing, it is a principle object of the present invention to provide an improved technique for recovery of iron from slag.

SUMMARY OF THE INVENTION

Briefly, the invention resides in an improved process for extracting iron from slag which is introduced into a reactor. According to the present invention, constituents are added to the slag, if necessary, to maintain a composition that includes 40 –60 percent $SiO_2$, 15–35 percent CaO, less than about 20 percent FeO and 5–10 percent $Al_2O_3$ and to maintain the ratio of $SiO_2$ to CaO in the slag in the range of about 2.0 to about 3.3.

DETAILED DESCRIPTION OF PARTICULAR PREFERRED EMBODIMENT

Figure 1:
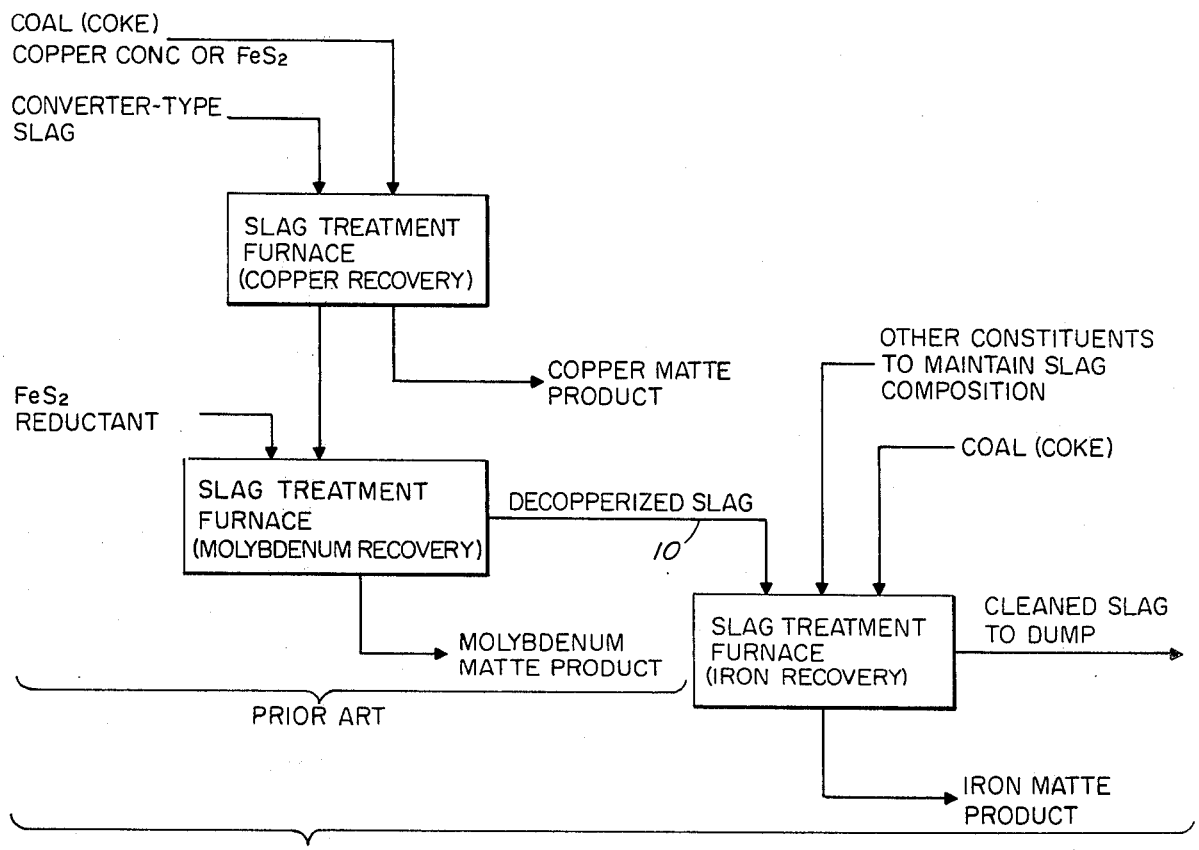
FIG. 1 is a flow sheet illustrating the successive recovery of (a) copper and molybdenum (prior art) and (b) iron (present invention) from converter-type slags; and, FIG. 2 is a schematic diagram illustrating a single stage pyrometallurgical reactor for the recovery of iron from converter slags in accordance with the present invention.

The left hand portion of FIG. 1 represents a flow sheet for the recovery of copper and molybdenum values from converter slags such as is taught by the above-mentioned U.S. Pat. Nos. 3,587,699 and 3,587,700. As is evident from those patents, after treatment to recover copper and molybdenum, the decopperized slag (represented by arrow 10 in FIG. 1) was a waste product and the iron values in the decopperized slag were totally lost. As is evident from FIG. 1, the decopperized slag 10, according to the present invention, forms an input to a slag treatment furnace designed for iron recovery. The composition for the decopperized slag 10 to be treated in the slag treatment furnace includes the following constituents:

40 – 70% FeO 6
25 – 40% $SiO_2$
5 – 10% $Al_2O_3$

The iron recovery treatment furnace can be operated either on a batch basis or continuously. In either case, other inputs to the furnace consist of a solid reductant (e.g., coal or coke) and other slag constituents which may be required to maintain the necessary slag composition, according to the present invention. With the preferred slag composition given below in Table I, typical other constituents which may have to be added to the treatment furnace include lime, (CaO) $FeS_2$, $Al_2O_3$, etc. The two outputs of the treatment furnace are an iron bearing phase, typically comprising an iron-rich matte product containing 85–90% iron which settles to the bottom of the treatment furnace, and cleaned slag as a waste product.

MECHANICAL SYSTEM

Figure 2:
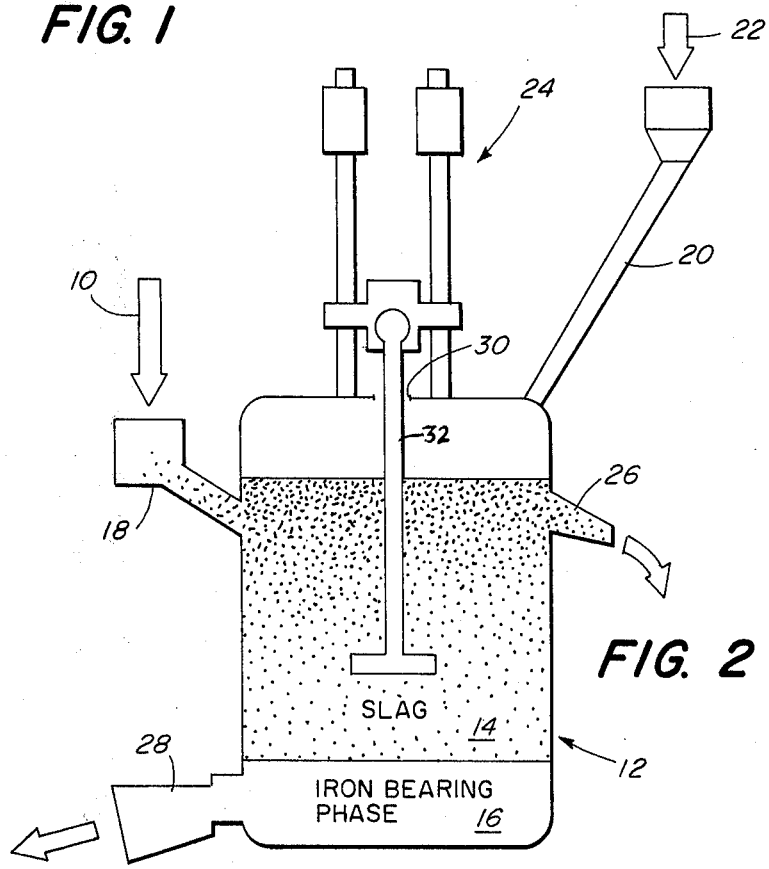

Referring to the schematic diagram of FIG. 2, there is shown a reactor 12 containing a slag 14 floating over a matte 16. The reactor is designed to operate on a continuous basis. The decopperized slag 10 is introduced into the reactor through launder 18 and the carbonaceous reductant, as well as other materials required to maintain the desired slag composition, are introduced through a hopper 20 as indicated by arrow 22.

Any conventional form of heating the contents of the reactor 12 can be provided and, for simplicity, no specific means of heating is shown. The heated contents of the reactor are mixed with a mechanical stirrer 24 which is preferably an internally cooled, metal bladed mechanical stirrer such as taught in U.S. Pat. No. 3,861,660, issued Jan. 21, 1975, owned by the Assignee of the present invention, and incorporated herein by reference. In addition to mixing the contents of the reactor generally, an important function of the stirrer 24 is to draw the typically light, particulate reductant from the surface of the slag into the volume thereof in order to greatly increase the area of contact between the reductant and the slag to promote reaction rates which contribute to a commercially feasible process for the recovery of iron from the slag.

Treated slag is drawn off as waste through a suitable outlet 26; and, the iron bearing phase is drawn off through an outlet 28. Naturally, the outlet 26 can lead to another stage of a multiple stage iron recovery reactor, since complete recovery of iron from the slag is never achieved and a further stage may be desirable to extract additional iron values.

As is well known, the reduction of the iron oxide by the carbon reductant results in gases being given off from the slag. Any suitable provision for removal of such gases from the reactor 12 is possible (e.g., opening 30 which surrounds the projecting shaft 32 of the stirrer assembly 24).

SLAG COMPOSITION

Copper smelting slags are basically fayalite slags ($2FeO.SiO_2$) which contain a few percent of $Al_2O_3$ and CaO, and also a few other constituents (MgO, $K_2O$ etc.). Additionally, the fayalite slag typically contains a few percent of sulfur, particularly when the slag is in a low oxidizing state.

Fayalite slag can be kept molten by preventing silica saturation with the addition of CaO and $Al_2O_3$ as needed even when iron oxide is reduced to 10%. According to the present invention it has been found that slags with a ratio of $SiO_2$ to CaO in the range of about 2.0 to about 3.3 are particularly desirable to assure a successful, commercially feasible technique of iron recovery.

Another important aspect of the slag composition is that there should be between about 5% and about 10% of $Al_2O_3$. The proper ratio of $SiO_2$ to CaO and the proper percentage of $Al_2O_3$ permit the slag to remain molten at the uncharacteristically low temperature of about 1400° C. Using the above criteria, the following are examples of slag which are deemed suitable for the recovery of iron using the process described above in connection with FIGS. 1 and 2.

At this point it should be noted that all percentages given in this specification and claims are by weight.

The pyrite requirement is estimated as approximately 0 – 4 percent of the treated slag in order to have a melting point of the metal product below about 1400° C.

A good slag in a pyrometallurgical system can be skimmed without difficulty when the slag viscosity becomes about 5 to 10 poise. It is expected that the fayalite slag becomes more viscose as the degree of FeO reduction progresses. The chance of foaming increases as the FeO content and the CaO content decreases. Consequently, the slag labelled B in the Table I is thought to be near a lower limit of both FeO and CaO at which the furnace will be practically operable.

At this point the importance of the composition of the slag to be treated is again emphasized and the significance of the ingredients to be added along with the reductant is explained. The most important parameter to follow in practicing the invention is to maintain the $SiO_2/CaO$ ratio within the range of 2.0–3.3 because this is the most economical manner to lower the operating temperature. For most slags, CaO must be added to maintain this ratio. If the starting slag does not contain an amount of sulfur equivalent to 5% of the total weight of the product, then it is desirable to add pyrite ($FeS_2$) so that the melting point of the slag will be below 1400° C. It is also important to control the pyrite additions so that the ratio of sulfur in the iron product to sulfur in the discard slag is 10 or less. It is also advantageous to maintain 5–10% $Al_2O_3$ in the slag. However, most slags contain this $Al_2O_3$ requirement, therefore, $Al_2O_3$ addition is not normally required.

It is of course desirable to recover as much iron as possible from the slag. By following the present invention, the maximum recovery is believed to be 88% of the total iron in the initial slag. This will produce a discard slag containing approximately 10% total iron. The amount of recovery actually sought will of course

TABLE I

Selected Effluent Slag Compositions
Lime Requirement & Iron Recovery

| Slag | Composition (Per Cent) | | | | | | Theoretical Requirement of Lime | Iron Recovery | |
|------|------|-----|------|-----|-----------|-------|------------------|------------------|------|
|      | $SiO_2$ | CaO | FeO | S | $Al_2O_3$ | Other | (Ton/Slag Ton) | (Ton/Slag Ton) | (%) |
| A    | 51.0 | 25  | 8.6  | 0.4 | 6.4 | 8.6 | 0.15 | 0.33 | (87) |
| B    | 55.5 | 17  | 10.0 | 0.4 | 9.2 | 7.9 | 0.08 | 0.33 | (87) |

The composition of the metal bearing matte product, of course, must be considered as well as that of the slag to determine the furnace operating temperature. Both the degree of iron reduction from the slag and degree of sulfurization (e.g., by pyrite addition) influence the specific melting point of the metal product. Although minor elements such as Sb, Bi, As, Pb, and Zn are found in copper smelting slags and are reduced to varying degrees, their contribution to the melting point of the metal product is thought to be minor. The projected composition of the metal product derived from slag B of Table I above is as follows:

depend upon economic considerations. Generally, the recovery range will be 60–80% of the total iron present in the slag to produce a discard slag containing 8–20% iron. The invention is further illustrated by the following non-limiting example.

EXAMPLE I

A pilot plant electric arc stirred furnace such as is disclosed in U.S. Pat. No. 3,861,660 was charged with 10 tons of molten converter slag having an initial composition including 57% iron oxide and 28% $SiO_2$, 5% $Al_2O_3$ and 10% of other constituents. The composition of the slag was modified in accordance with the above

TABLE II

| Projected Composition of Matte Product | | | | | | |
|---|---|---|---|---|---|---|
|  | Fe | Cu | Mo | S | Others | Total |
| Metal Composition (%) | 87 | 1.6 | 0.8 | 5.7 | 4.9 | 100 |
| Metal Quantity* | 30.5 | 0.57 | 0.28 | 2.0 | 1.75 | 35.13 |

*Tons/100 tons of slag with 87% iron yield.

teaching by the addition of lime (CaO) to yield a slag with a SiO$_2$/CaO ratio in the range of 2.0–3.3. The slag was maintained molten at approximately 1300° C. About 400 lbs. of coke was also charged to the furnace and two mechanical stirrers, each constructed in accordance with the teaching of the above-mentioned U.S. Pat. No. 3,861,660 were operated at 120 and 150 RPM to pump the light coke into the slag. In 3 hours, 1.2 tons of metallic iron-rich matte was produced. This was equivalent to about 26% of the contained iron. The rate of iron production was about 0.013 tons of iron per hour per square foot of hearth. This rate compares with 0.00234 tons of iron per hour per square foot of hearth obtained by Beck et al. (cited above).

EXAMPLE II

Material balances for treating another slag in accordance with the general procedure of Example I is given below:

10 tons stirred electric furnace

| (A) Starting Slag | Tons | % | (C) Added agents | |
|---|---|---|---|---|
| SiO$_2$ | 3.0 | 30 | (1) Burnt lime | 1.6 ton |
| FeO | 5.1 | 51 | (2) Pyrite | 0.1 ton |
| Al$_2$O$_3$ | 0.8 | 8 | | |
| Cu | 0.05 | 0.5 | (D) Temperature - 1400° C | |
| S | 0.15 | 1.5 | Time of treatment - 10 hrs. | |
| Others | 0.8 | 8 | Specific Reaction Rate - 3.5 × 10$^{-3}$ ton Iron/(ft)$^3$ slag hr. | |
| Total | 10.0 | 100 | | |
| | | | (E) Discard Slag | |
| (B) Product | | | | Tons | % |
| Iron-Rich Matte | | | SiO$_2$ | 3.0 | 41.6 |
| | Tons | % | CaO | 1.6 | 22 |
| Fe | 3.2 | 93 | Al$_2$O$_3$ | 0.8 | 11 |
| Cu | 0.04 | 1. | FeO | 1.0 | 14 |
| S | 0.17 | 5. | S | 0.02 | 0.3 |
| Others | 0.04 | 1 | Others | 0.8 | 11. |
| | 3.45 | 100 | | 7.2 | 99.9 |

Coal consumption - 1 ton coke, 85% carbon

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting iron from slag comprising the steps of:
   a. introducing the slag into a reactor;
   b. maintaining a CaO/SiO$_2$ ratio in the range of 2.0–3.3 in slag in the reactor;
   c. maintaining the temperature of the slag in the reactor at a level at which the slag is molten;
   d. adding a solid carbonaceous reductant to the molten slag in the reactor at a rate sufficient to reduce FeO in said slag;
   e. mixing said reductant into the molten slag in the reactor with an internally cooled, metal bladed, rotating stirrer driven at a rate sufficient to pump said reductant into the slag to enhance said reduction of FeO; and,
   f. separating an iron bearing phase from the slag.

2. The process as set forth in claim 1 wherein in step (a) the CaO/SiO$_2$ ratio is maintained in the range of 2.0 – 3.3 by the addition of CaO and SiO$_2$ as needed and wherein the amount of Al$_2$O$_3$ in the slag is maintained at 5–10%.

3. The process of claim 1 wherein said input of feed slag has the following composition:

| Constituent | Percent by Weight |
|---|---|
| FeO | 40–70 |
| SiO$_2$ | 25–40 |
| CaO | 2–5 |
| Al$_2$O$_3$ | 1–10 |
| S | 0.8–2 | the discarded slag has the following composition:

| Constituent | Percent by Weight |
|---|---|
| FeO | less than 20% |
| SiO$_2$ | 40–60 |
| CaO | 15–35 |
| Al$_2$O$_3$ | 5–10 | and wherein the slag and metal bearing phase remain molten at a temperature lower than 1400° C.

4. The process as set forth in claim 3 and wherein an amount of pyrite based on 0–4 percent of the treated iron bearing phase is added as needed to maintain the sulfur content of the slag at a level of at least 5% of the iron in the iron bearing phase.

* * * * *